United States Patent

Schäfer et al.

[11] 4,120,837
[45] Oct. 17, 1978

[54] ORGANOSILOXANES USEFUL IN MOLDING COMPOSITIONS BASED ON UNSATURATED POLYESTERS AND UNSATURATED MONOMERS

[75] Inventors: Werner Schäfer, Diedenbergen; Hans-Albrecht Scholz, Hochheim; Siegfried Wilhelm, Wiesbaden, all of Germany

[73] Assignee: Rutgerswerke Aktiengesellschaft, Frankfurt am Main, Germany

[21] Appl. No.: 794,996

[22] Filed: May 9, 1977

[30] Foreign Application Priority Data

May 15, 1976 [DE] Fed. Rep. of Germany ....... 2621740

[51] Int. Cl.² .............................................. C08L 67/06
[52] U.S. Cl. .............................. 260/22 S; 260/22 CB; 260/29.1 SB; 260/37 SB; 260/40 R; 260/824 R; 260/865
[58] Field of Search ............. 260/22 S, 22 CB, 824 R, 260/29.1 SB, 375 B, 40 R, 865

[56] References Cited

U.S. PATENT DOCUMENTS

| | | | |
|---|---|---|---|
| 3,652,484 | 3/1972 | Weissermel et al. | 260/40 R |
| 3,909,475 | 9/1975 | Schneider | 260/29.1 SB |
| 3,959,203 | 5/1976 | Keil | 260/29.1 SB |
| 4,032,494 | 6/1977 | Gentry | 260/40 R |

Primary Examiner—Eugene C. Rzucidlo
Attorney, Agent, or Firm—Hammond & Littell

[57] ABSTRACT

Molding compositions, based on unsaturated polyester resins, unsaturated monomers, catalysts, inorganic and/or organic fillers and/or reinforcing agents, dyestuffs and/or pigments, lubricants and optionally inhibitors, containing a siloxane of the formula

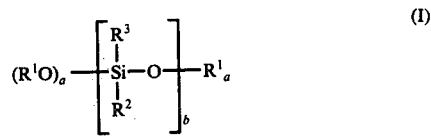

wherein
  $a$ is 0 or 1
  $b$ is a number from 1 to 500, provided that when $a$ is 0, $b$ must be equal to or greater than 3 and the compound is a cyclosiloxane,
  $R^1$ is hydrogen, alkyl or trimethylsilyl,
  $R^2$ is alkyl of 8 to 32 carbon atoms, $-R^4OCOR^5$, or $-R^4OR^6$, where $R^4$ is a bivalent radical, $R^5$ is alkyl of 12 to 22 carbon atoms and $R^6$ is alkyl of 8 to 22 carbon atoms, provided that up to 80 mole % of the above-mentioned radicals defining $R^2$ may be methyl and provided further that at least one $R^2$ per molecule is other than methyl, and
  $R^3$ is methyl or alkoxy of 1 to 4 carbon atoms, and/or a carboxysiloxane as an eternal and/or internal lubricant, optionally together with an additional external and/or internal lubricant.

38 Claims, No Drawings

ORGANOSILOXANES USEFUL IN MOLDING COMPOSITIONS BASED ON UNSATURATED POLYESTERS AND UNSATURATED MONOMERS

THE PRIOR ART

Due to their excellent electrical and thermal properties, hardenable molding compositions are being processed to an increasing extent by modern processing methods, in particular by injection molding, to produce an enormous variety of molded parts for the electrical industry.

Regardless of the processing method, the processing of these molding compositions must take place in chrome plated dies because the molded parts can be removed only with difficulty, particularly in mass production, if the processing takes place in dies made of normal tool steel or steels of a higher chromium content. Also, the flash, i.e. excess, squeezed-out material still attached to the molded part, tends to stick to surfaces other than those serving to mold the molded part. This mold separation problem is a great obstacle to economical manufacturing so that processing in dies which were not chrome plated has hitherto been impossible in mass production.

In order to be able to process the molding compositions unobjectionably, the use of an internal lubricant has been found necessary to control the flow processes after the molding composition melts in the plasticization zone and when it is being injected into the die.

Among known molding compositions may be mentioned colorfast molding compositions containing melamine resins, accelerators, fillers, an external lubricant based on a carboxyorganosiloxane and, if desirable, an internal lubricant.

It is also known to use carboxyorganosiloxanes for the hardening of amine or phenolic resins while they are being molded, such as in the production of laminated plastics.

External lubricants, on the one hand, and internal lubricants on the other should be present in molding compositions in as low a concentration as possible to avoid an impairment of the surfaces of the molded parts and to influence the overall characteristics of the molded parts as little as possible.

OBJECTS OF THE INVENTION

It is an object of the present invention to provide an additive for addition to moldable compositions based on unsaturated polyester resins which overcomes the above enumerated drawbacks and gives a readily shapeable, moldable composition.

It is another object of the present invention to make it possible to process molding compositions based on unsaturated polyesters without any difficulty in dies which are not chrome plated and to remove the molded parts thereby produced from these dies without any difficulty, while at the same time enabling the easy removal from no longer molding surfaces of flash which might possibly have adhered to the mold parts.

It is a further object of the present invention to make it possible to readily carry out the processing of molding compositions based on unsaturated polyesters in dies which are not chrome plated in modern mass production operations.

It is still a further object of the present invention to provide a molding composition based on unsaturated polyesters which contains siloxanes which can serve as both internal and external lubricant.

It is yet another object of the present invention to provide a molding composition comprising unsaturated polyester resins, unsaturated monomers, catalysts, inorganic and/or organic fillers and/or strengtheners, dyestuffs and/or pigments, lubricants and optionally inhibitors, and siloxanes of the formula

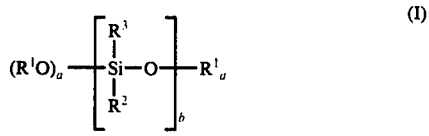

wherein
$a$ is 0 or 1
$b$ is a number from 1 to 500, provided that when $a$ is 0, $b$ must be equal to or greater than 3 and the compound is a cyclosiloxane,
$R^1$ is hydrogen, alkyl or trimethylsilyl,
$R^2$ is alkyl of 8 to 32 carbon atoms, $-R^4OCOR^5$, or $-R^4OR^6$, where $R^4$ is a bivalent radical, $R^5$ is alkyl of 12 to 22 carbon atoms and $R^6$ is alkyl of 8 to 22 carbon atoms, provided that up to 80 mole % of the above-mentioned radicals defining $R^2$ may be methyl and provided further that at least one $R^2$ per molecule is other than methyl, and
$R^3$ is methyl or alkoxy of 1 to 4 carbon atoms, and/or a carboxysiloxane.

It is a yet further object of the present invention to provide a process of manufacturing molded compositions based on unsaturated polyester resins which comprises adding at least one of the above mentioned siloxanes to the moldable composition, subjecting the lubricated moldable composition to the action of temperature and pressure in a shaping operation, and recovering a shaped non-fusible product.

These and other objects of the present invention will become more apparent as the description thereof proceeds.

DESCRIPTION OF THE INVENTION

It has now been found that the above-mentioned disadvantages can be avoided and the above objects can be achieved if a special organosiloxane additive is employed in moldable compositions based on unsaturated polyester resins, which are to be further shaped.

The molding compositions of the present invention are comprised of unsaturated polyester resins, unsaturated monomers, catalysts, inorganic and/or organic fillers and/or strengtheners, dyestuffs and/or pigments, lubricants, optionally inhibitors and siloxanes of the formula

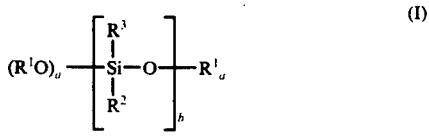

wherein
$a$ is 0 or 1.
$b$ is a number from 1 to 500, provided that when $a$ is 0, $b$ is equal to or greater than 3 and the compound is a cyclosiloxane, $R^1$ is a member selected from the group consisting of hydrogen, alkyl, preferably alkyl of 1 to 2 carbon atoms, and trimethylsilyl, $R^2$ is a member selected from the group consisting of alkyl of 8 to 32 carbon atoms,

and —$R^4OR^6$, where $R^4$ is a divalent radical, preferably alkylene of 1 to 10 carbon atoms, more preferably alkylene of 2 to 3 carbon atoms, $R^5$ is alkyl of 12 to 22 carbon atoms and $R^6$ is alkyl of 8 to 22 carbon atoms, provided that up to 80 mole % of the above-mentioned radicals may be replaced by methyl and provided further that at least one $R^2$ group per molecule is other than methyl, and $R^3$ is methyl or alkoxy of 1 to 4 carbon atoms and/or, preferably, a carboxyorganosiloxane as an external and/or internal lubricant, optionally together with an additional external and/or internal lubricant.

The present invention also relates to the improvement in the process of manufacturing molding compositions based on unsaturated polyester resins, unsaturated monomers, catalysts, inorganic and/or organic fillers and/or reinforcing agents, dyes and/or pigments, lubricants, and optionally inhibitors which involves the use of one or a mixture of the above-described siloxanes as the external and/or internal lubricant. The processing comprises the steps of adding at least one of the above-mentioned siloxanes to the moldable compositions, subjecting the lubricated moldable composition to the action of temperature and pressure in a shaping operation, and recovering a shaped non-fusible product.

In general, the chemical structure of the carboxy organosiloxanes of the present invention corresponds to that of a linear methyl silicone with a continuous Si—O—Si— chain, where, however, a large portion, for example from 5 to 30%, of the alkyl groups are replaced by ester groupings, for instance to a siloxane of the formula I wherein $R^2$ is —alk—$COOR^7$ where —alk— is alkylene such as —$(CH_2)_{10}$— and $R^7$ is alkyl. In the ester groupings of the carboxy organosiloxanes of the invention, i.e. the —alk—$COOR^7$ groupings, —alk— can be alkylene of 1 to 22 carbon atoms and $R^7$ can be alkyl of 1 to 4 carbon atoms. Advantageously, a carboxyorganosiloxane which is esterified with an alkanol of up to 4 carbon atoms, preferably with methanol, is used, and especially one with the following characteristic values: Acid number below 5, preferably 2 to 4; saponification number 150 to 300; preferably 100 to 250; molecular weight 800 to 2000, preferably 1000 to 1300; $SiO_2$—content 15 to 30, preferably 20 to 25 weight-%. The content of siloxane may be 0.01 to 1.0, preferably 0.05 to 0.5 weight-%, based on the total weight of the molding composition.

The siloxanes used in accordance with the invention may be prepared by known processes for the preparation of organopolysiloxanes (cf., e.g., Ullman's Encyklopadie der Technischen Chemie 15, 1964, pg 770).

In accordance with the present invention, the above-mentioned siloxanes are used in the manufacture of molding compositions based on unsaturated polyester resins.

In general, the unsaturated polyester resins are produced from olefinically unsaturated polycarboxylic acids or their anhydrides and polyhydroxy alcohols. Carboxylic acids having no double bonds may be co-used in the molding compositions.

Useful in the invention are dicarboxylic acids which can be aliphatic, cycloaliphatic, aromatic, combinations of aromatic and aliphatic, and substituted groups thereof. The aliphatic and cycloaliphatic dicarboxylic acids and acid anhydrides include both the saturated and unsaturated ones. Among the cycloaliphatic compounds, the cyclic anhydrides of dicarboxylic acids having five- or six-membered rings are particularly advantageous.

Examples of suitable unsaturated carboxylic acids and anhydrides which can be used are maleic acid, fumaric acid, maleic anhydride, itaconic acid, citraconic acid, citraconic anhydride, 2-dodecen-1-ylsuccinic anhydride, tetrahydrophthalic acid anhydride and endomethylene-tetrahydrophthalic acid anhydride. Maleic and fumaric acids are preferred unsaturated dicarboxylic acids.

Examples of suitable co-carboxylic acids for use in the invention are adipic, sebacic, azelaic, suberic, phthalic, isophthalic, terephthalic, naphthalene dicarboxylic and cyclohexane dicarboxylic acids. Where available, the carboxylic acid anhydrides may be used in place of the acids.

Preferred as carboxylic acids containing no polymerizable double bonds are phthalic acids, such as phthalic acid, terephthalic acid and isophthalic acid, in particular terephthalic acid.

Among the dicarboxylic acids and acid anhydrides which can be used in the polyester resins of the molding compositions of the invention special mention should be made of those alkane-dioic acids and acid anhydrides having 2 to 6 carbons in the alkane residue, alkenedioic acids and acid anhydrides having 2 to 6 carbon atoms in the alkene residue, benzene dicarboxylic acids and acid anhydrides, cycloalkane dicarboxylic acids and acid anhydrides having 5 to 8 carbons in the cycloalkane residue, cycloalkene dicarboxylic acids and acid anhydrides having 5 to 8 carbons in the cycloalkene residue, and endoalkylenecycloalkene dicarboxylic acids and acid anhydrides having 7 to 8 carbons in the endoalkylene-cycloalkene residue.

Suitable as the polyhydroxy alcohol component of the unsaturated polyester resins can be any straight- or branched-chain, saturated or unsaturated aliphatic, saturated or unsaturated cycloaliphatic, aromatic, or aromatic/aliphatic alcohol. Suitable as alcohols are, for instance, diols with 2 to 10, preferably 2 to 4, carbon atoms, such as ethylene glycol, 1,2- and 1,3-propanediol, 1,4-butanediol, 2-butene-1,4-diol, dimethylpropanediol-1,3, diethylene glycol, dipropylene glycol, dibutylene glycol, dimethylol cyclohexane, dimethylol benzene, bis(hydroxyethyl)-diphenylol propane, bis-(hydroxypropyl)-diphenylol propane, glycerin monoethyl ether and glycerin monoacetate. Suitable as the alcohol component of the polyesters are, e.g., alkane, alkene, and oxyalkane diols of 2 to 10 carbon atoms, cycloalkane and cycloalkene diols of 5 to 10 carbon atoms, and dihydroxy aromatic diols. Such diols can be substituted by non-interfering substituents such as alkoxy, phenoxy, alkyl, ester, halo, etc. Particularly preferred, are ethane-, propane-, and butanediol.

Suitable polyesters for the molding compositions of the invention are also those according to German Auslegungschrift No. 1,544,673 and German Patent DBP No. 1,469,895, the teachings of which are incorporated herein by reference.

According to one advantageous embodiment, the polyesters have a molecular weight from 500 to 3000, an olefinic double bond reactivity from 142 to 2000, preferably from 150 to 400 g polyester resin, and an acid number from 20 to 50, preferably 30 to 40. Their OH number may be the same as their acid number.

The polyester percentage, relative to the total molding composition, advantageously amounts to 12 to 40, preferably 15 to 30, percent by weight.

The molding compositions of the invention also contain unsaturated monomers. Suitable unsaturated monomers are, for example, vinyl and/or allyl compounds, preferably those whose boiling point is above 140° C., more preferably styrene and diallyl phthalate. The vinyl and allyl groups can be attached to a radical which is selected from aliphatic, cycloaliphatic, aromatic, or heterocyclic radicals, or combinations of said radicals. Other examples of suitable vinyl and allyl monomers suitable in the molding compositions of the invention are: vinyl toluene, halogenated styrene, α-methylstyrene, diallyl maleate, diallyl furmarate, diallyl itaconate, diallyl succinate, diallyl adipate, diallyl azelate, diallyl sebacate, diallyl isophthalate, triallyl cyanurate, triallyl phosphate, the allyl ethers of multivalent alcohols such as pentaerythrityl tetraallyl ether or trimethylol propane triallyl ether, ethylene glycol dimethacrylate, 1,3,5-trisacrylo-hexahydrotriazine, and the like. The percentage of unsaturated monomers, relative to the total molding composition, is advantageously 0.5 to 5, preferably 1 to 3, percent by weight.

Suitable molding compositions of the invention contain, for example, a polyester based on terephthalic acid; an unsaturated dicarboxylic acid, preferably maleic acid and/or fumaric acid, and a diol of 2 to 4 carbon atoms, as well as an unsaturated monomer in the form of styrene and/or diallyl phthalate.

Another component of the molding compositions of the invention are the peroxide catalysts (initiators) of conventional structure, such as those mentioned in the German Auslegungschrift No. 1,544,673. Examples of such conventional initiators are benzoyl peroxide, acetyl peroxide, di-t-butyl peroxide, etc.

The molding compositions may optionally contain inhibitors, which are the conventional substances used for this purpose, such as phenols, hydroquinone, etc.

Suitable inorganic fillers for use in the molding compositions of the invention are, for example, calcium carbonate and/or magnesium carbonate and/or inert silicates. Suitable organic fillers are, for instance, saw dust and cellulose powder, which may be used either individually or in combination. The inorganic and organic fillers may also be present together in the molding compositions of the invention.

In addition, reinforcing agents (strengtheners) may be added to increase the mechanical resistance and heat stability of the compositions. If strengtheners are present, they may be of inorganic or organic nature. The molding compositions contain as strengtheners synthetic or natural fibers such as glass, polyamide, polyester, cotton and cellulose fibers, asbestos and other mineral fibers such as mineral wool and metal titanates. Glass fibers and polyamide fibers are preferred reinforcing agents. The thermostable organic synthetic fibers used may be colored with a fast dye.

The total percentage of fillers and reinforcing agents, relative to the total molding composition, may in general amount to 30 to 85, preferably 50 to 75 percent by weight, and that of the reinforcing agents alone 5 to 30, preferably 15 to 25 percent by weight.

Dyes and pigments may also be incorporated into the molding compositions as desired, preferably those which are resistant to yellowing, carbonizing and cracking, such as zinc sulfide, barium sulfate, titanium dioxide, iron oxide, carbon black and organic pigments and dyes.

Although the addition of extra internal and/or external lubricants is not required in the molding compositions according to the invention because they contain the above described siloxanes, such additional internal and/or external lubricants may be used in these compositions. The additional lubricants which may be used in the molding compositions are those which, like the other components, are not decomposed to form colored substances at the temperatures used. An external lubricant or mold release agent is a substance which predominantly reduces the adhesion of the molding composition to the metal surfaces of the mold, and an internal lubricant effects a reduction in the friction between the particles in the molding composition.

As external lubricants there may be used, in admixture with the siloxanes of the invention, salts of saturated and/or unsaturated aliphatic acids with 12 to 20 carbon atoms, preferably salts of stearic, palmitic, oleic, linoleic and linolenic acids, as for example the magnesium, calcium, zinc and aluminum salts, and/or amides of these aliphatic acids, either singly or mixed. The percentage of these additional lubricants, relative to the total molding composition, may total up to 3 percent, such as e.g. 0.3 to 2 percent, by weight.

Additional internal lubricants are not necessarily included in the molding compositions of the invention, although if desired they may be incorporated. Internal lubricants which may be added to the molding compositions according to the invention include, for example, esters of aliphatic and aromatic mono- and polycarboxylic acids containing up to 18 carbon atoms with saturated or olefinically unsaturated, aliphatic (including cycloaliphatic), mono- or polyhydric alcohols with 2 to 9 carbon atoms and amides and sulphonates of fatty acids with 16 to 24 carbon atoms. Esters of stearic, palmitic, coconut oil, ricinoleic, adipic, sebacic, maleic, fumaric, benzoic, phthalic, isophthalic, terephthalic, trimellitic, pyromellitic acid and hydroxycarboxylic acids, such as salicylic acid, may be used as internal lubricants. Particularly preferred are esters of phthalic, isophthalic and terephthalic acids of general formula

[wherein $R^8$ and $R^9$ which may be the same or different and represent alkoxy (including cycloalkoxy) groups containing from 2 to 9 carbon atoms, $R^{10}$ represents an oxyalkyleneoxy (including oxycycloalkyleneoxy) group containing from 2 to 9 carbon atoms and $n$ is an integer from 0 to 8]; for example esters of general formula II wherein $R^8$ and $R^9$ represent alkoxy groups from a butyl, octyl, nonyl, allyl or cyclohexyl alcohol and $R^{10}$ represents an oxyalkyleneoxy group from ethylene glycol, diethylene glycol or a propane, butane or cyclohexanediol.

The internal lubricants are present, if at all, in amounts of 0.1 to 3, preferably 0.3 to 1% by weight, based on the total composition.

The molding compositions of the invention have the advantage that the siloxanes contained in them surprisingly reduce the viscosity so much that a sufficient viscosity reduction is already obtained at a low concentration. It has not been possible up until now to process polyester molding compositions with such low external lubricant concentrations and to influence the viscosity of such compositions at such low concentrations of this lubricant. It was surprising, moreover, that the external lubricant at the same time fulfills the viscosity reduction function. This brings with it the advantage that, in contrast to the hitherto known molding compositions based on polyester resins, no additional internal lubricants are any longer needed. Beyond this, the siloxanes of the invention remain completely color-neutral, even under subsequent thermal stress of the molded parts in air. This is of particular significance for brightly tinted molding compositions because all conventional external and internal lubricants will crack and lead to discolorations at elevated temperatures. The molded parts can furthermore be prepared in dies which are not chrome plated.

The molding compositions of the invention are particularly well suited for electrical components such as electrical insulating material, particularly insulators, circuit components and switch boards. Furthermore, due to their good manufacturing properties, the molding compositions can be used for the manufacture of heat insulating materials, home appliances, fittings, pan and tool handles, range parts, and the like.

The present invention will now be further described by means of the following Examples which are not to be limitative in any manner. In the following examples, P means parts by weight.

EXAMPLES

Example 1

250 P of a crystallizable, molten, unsaturated polyester (acid number 35), produced from 60 mole percent of maleic anhydride and 40 mole percent of terephthalic acid as the acid component and 100 mole percent of ethylene glycol as the alcohol component, 10 P of benzoyl peroxide, 0.2 P of a siloxane (characteristic data: acid number 3.5, saponification number 220, molecular weight 1180 and $SiO_2$ content 23%), 20 P of diallyl phthalate, 500 P ground limestone, 110 P ground kaolin and 100 P "volanized" (i.e. provided with binders) short glass fibers were mixed in an extruder at 50° C. The composition which formed was briefly stored at room temperature for 30 to 60 minutes and, after setting, milled in a hammer mill.

Properties of the material in hardened state:
Bending strength, $kg/cm^2$: 650
Imact strength, $kgcm/cm^2$: 4.5
Stability of shape under heat (after Martens), °C.: 110
Dielectric loss factor tan δ: 0.006

Example 2

300 P of the unsaturated polyester of Example 1, 10 P tertiary butyl perbenzoate, 2 P of a siloxane (charateristic data: acid number 3.5, saponification number 220, molecular weight 1180 and $SiO_2$ content 23%), 20 P diallyl phthalate, 500 P ground limestone, 50 P ground kaolin and 100 P "volanized" (i.e. provided with binders) short glass fibers were mixed in an extruder at 50° C. The composition which formed was stored briefly at room temperature for 30 to 60 minutes and, after setting, milled in a hammer mill.

Example 3

Further molding compositions of the invention are prepared by following the procedure of Example 2 but using the following polyesters and unsaturated monomers in place of the polyester and unsaturated monomer of Example 2:

| | | | |
|---|---|---|---|
| A. | a) Polyester: | 40 mole percent | citraconic anhydride |
| | | 60 mole percent | phthalic acid |
| | | 100 mole percent | 1,4-butanediol |
| | b) Unsaturated Monomer: | | styrene |
| B. | a) Polyester: | 25 mole percent | 4-cyclohexene-1,2-dicarboxylic anhydride |
| | | 75 mole percent | terephthalic acid |
| | | 100 mole percent | 1,3-propanediol |
| | b) Unsaturated Monomer: | | diallyl adipate |
| C. | a) Polyester: | 50 mole percent | maleic anhydride |
| | | 50 mole percent | terephthalic acid |
| | | 50 mole percent | ethylene glycol |
| | | 50 mole percent | 2-butene-1,4-diol |
| | b) Unsaturated Monomer: | | ethylene glycol dimethacrylate |
| D. | a) Polyester: | 10 mole percent | succinic anhydride |
| | | 60 mole percent | maleic anhydride |
| | | 30 mole percent | terephthalic acid |
| | | 100 mole percent | diethylene glycol |
| | b) Unsaturated Monomer: | | diallyl isophthalate |
| E. | a) Polyester: | 25 mole percent | maleic acid |
| | | 25 mole percent | fumaric acid |
| | | 50 mole percent | terephthalic acid |
| | | 50 mole percent | 1,4-butanediol |
| | | 50 mole percent | 2-butene-1,4-diol |
| | b) Unsaturated Monomer: | 50 mole percent | diallyl phthalate |
| | | 50 mole percent | diallyl maleate | we claim:
1. A molding composition comprising
(i) 12 to 40 weight percent of unsaturated polyester resins,
(ii) 0.5 to 5 weight percent of unsaturated monomers,
(iii) 30 to 85 weight percent of a member selected from the group consisting of inorganic fillers, organic fillers, reinforcing agents, and mixtures thereof,
(iv) 0.01 to 1.0 weight percent of at least one siloxane selected from the group consisting of
(A) a siloxane of the formula

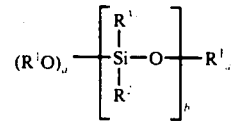

wherein
$a$ is 0 or 1,
$b$ is a number from 1 to 500, provided that when $a$ is 0, $b$ is equal to or greater than 3 and the compound is a cyclosiloxane,
$R^1$ is a member selected from the group consisting of hydrogen, alkyl and trimethylsilyl,
$R^2$ is a member selected from the group consisting of alkyl of 8 to 32 carbon atoms,

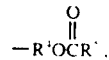

and —R$^4$OR$^6$, where R$^4$ is a divalent radical, R$^5$ is alkyl of 12 to 22 carbon atoms and R$^6$ is alkyl of 8 to 22 carbon atoms, provided that up to 80 mole % of the above-mentioned radicals may be replaced by methyl and provided further that at least one R$^2$ group per molecule is other than methyl, and R$^3$ is methyl or alkoxy of 1 to 4 carbon atoms, (B) a carboxyorganosiloxane which corresponds in structure to that of a linear methyl silicone having a continuous Si—O—Si— chain wherein a large portion of the alkyl groups are replaced by ester groupings prepared by esterification with an alcohol having from 1 to 4 carbon atoms, and (C) a mixture of the above siloxanes, said siloxane or mixture of siloxanes acting as an external and/or internal lubricant, and (v) the remainder catalysts and a member selected from the group consisting of dyestuffs, pigments and mixtures thereof in conventional amounts.

2. The molding composition of claim 1 wherein the siloxane is a carboxyorganosiloxane prepared by esterification with an alcohol having from 1 to 4 carbon atoms.

3. The molding composition of claim 1 wherein the siloxane is a carboxyorganosiloxane prepared by esterification with methanol.

4. The molding composition of claim 1 which contains 0.05 to 0.5 weight percent of the siloxane, relative to the total composition.

5. The molding composition of claim 1 wherein the acid component of the unsaturated polyester is terephthalic acid and an unsaturated dicarboxylic acid and the alcohol component is a diol having 2 to 4 carbon atoms and the unsaturated monomer is a member selected from the group consisting of styrene, diallyl phthalate, and mixtures of styrene and diallyl phthalate.

6. The molding composition of claim 5 wherein the unsaturated dicarboxylic acid is selected from the group consisting of maleic acid, fumaric acid, and mixtures of maleic acid and fumaric acid.

7. The molding composition of claim 1 wherein the weight percent of polyester is 15 to 30 weight percent and the weight percent of unsaturated monomer is 1 to 3 weight percent.

8. The molding composition of claim 1 which contains as inorganic filler a member selected from the group consisting of calcium carbonate, magnesium carbonate, inert silicates, mixtures of said carbonates, and mixtures of said carbonates and silicates.

9. The molding composition of claim 1 which contains 50 to 75 weight percent fillers and reinforcing agents.

10. The molding composition of claim 1 which contains reinforcing agents selected from the group consisting of glass fibers, polyamide fibers, and mixtures of glass fibers and polyamide fibers.

11. The molding composition of claim 1 which contains 5 to 30 weight percent reinforcing agents, relative to the total composition.

12. The molding composition of claim 11 which contains 15 to 25 weight percent reinforcing agents.

13. The molding composition of claim 1 which additionally contains inhibitors in conventional amounts.

14. The molding composition of claim 1 which additionally contains a member selected from the group consisting of (a) up to 3 weight percent of additional external lubricants, (b) 0.1 to 3 weight percent of additional internal lubricants, and (c) mixtures thereof.

15. The molding composition of claim 14 which contains a magnesium, calcium, zinc or aluminum salt of saturated and/or unsaturated aliphatic fatty acids.

16. The molding composition of claim 11 which contains 0.3 to 3 weight percent of the fatty acid salt, relative to the total composition.

17. The molding composition of claim 1 which additionally contains a member selected from the group consisting of (a) up to 3 weight percent of additional external lubricants, (b) 0.1 to 3 weight percent of additional internal lubricants, and (c) mixtures thereof and inhibitors in conventional amounts.

18. The molding composition of claim 3 wherein the carboxyorganosiloxane has the following characteristic values: acid number below 5; saponification number 150 to 300; molecular weight 800 to 2000; and SiO$_2$— content 15 to 30 weight %.

19. The molding composition of claim 3 wherein the carboxyorganosiloxane has the following characteristic values: acid number 2 to 4; saponification number 100 to 250; molecular weight 1000 to 1300; and SiO$_2$— content 20 to 25 weight %.

20. The molding composition of claim 19 wherein the unsaturated polyester has a molecular weight from 500 to 3000, an olefinic double bond reactivity from 142 to 2000 g polyester resin and an acid number from 20 to 50.

21. The molding composition of claim 19 wherein the unsaturated polyester has a molecular weight from 500 to 3000, an olefinic double bond reactivity from 150 to 400 g polyester resin and an acid number from 30 to 40.

22. The molding composition of claim 21 wherein the acid component of the unsaturated polyester is terephthalic acid and an unsaturated dicarboxylic acid and the alcohol component is a diol having 2 to 4 carbon atoms and the unsaturated monomer is a member selected from the group consisting of styrene, diallyl phthalate, and mixtures of styrene and diallyl phthalate.

23. The molding composition of claim 22 wherein the unsaturated dicarboxylic acid is selected from the group consisting of maleic acid, fumaric acid, and mixtures of maleic acid and fumaric acid.

24. In a process for the manufacture of a molded body, wherein a lubricant is added to the moldable composition of claim 1, the lubricated moldable composition is subjected to the action of the conventional temperature and pressure employed in the shaping of said lubricated moldable composition, and a shaped non-fusible product is recovered, the improvement comprising using 0.01 to 1 weight percent of the siloxane of claim 1 as the external and/or internal lubricant.

25. The process of claim 24 wherein the siloxane is used in an amount of 0.05 to 0.5 weight percent, relative to the total composition.

26. THe process of claim 24 wherein the manufacture of molded parts from the molding compositions the hardening takes place in dies which are not chrome plated.

27. The process of claim 24 wherein the molding composition additionally contains inhibitors in conventional amounts.

28. The process of claim 24 wherein the molding composition additionally contains a member selected from the group consisting of (a) up to 3 weight percent of additional external lubricants, (b) 0.1 to 3 weight percent of additional internal lubricants, and (c) mixtures thereof.

29. The process of claim 24 wherein the molding composition additionally contains a member selected from the group consisting of (a) up to 3 weight percent of additional external lubricants, (b) 0.1 to 3 weight percent of additional internal lubricants, and (c) mixtures thereof and inhibitors in conventional amounts.

30. The process of claim 24 wherein the siloxane is a carboxyorganosiloxane prepared by esterification with an alcohol having from 1 to 4 carbon atoms.

31. The process of claim 24 wherein the siloxane is a carboxyorganosiloxane prepared by esterification with methanol.

32. The process of claim 31 wherein the carboxyorganosiloxane has the following characteristic values: acid number below 5; saponification number 150 to 300; molecular weight 800 to 2000; and $SiO_2$— content 15 to 30 weight %.

33. The process of claim 31 wherein the carboxyorganosiloxane has the following characteristic values: acid number 2 to 4; saponification number 100 to 250; molecular weight 1000 to 1300; and $SiO_2$— content 20 to 25 weight %.

34. The process of claim 33 wherein the unsaturated polyester has a molecular weight from 500 to 3000, an olefinic double bond reactivity from 142 to 2000 g polyester resin and an acid number from 20 to 50.

35. The process of claim 33 wherein the unsaturated polyester has a molecular weight from 500 to 3000, an olefinic double bond reactivity from 150 to 400 g polyester resin and an acid number from 30 to 40.

36. The process of claim 35 wherein the acid component of the unsaturated polyester is terephthalic acid and an unsaturated dicarboxylic acid and the alcohol component is a diol having 2 to 4 carbon atoms and the unsaturated monomer is a member selected from the group consisting of styrene, diallyl phthalate, and mixtures of styrene and diallyl phthalate.

37. The process of claim 36 wherein the unsaturated dicarboxylic acid is selected from the group consisting of maleic acid, fumaric acid, and mixtures of maleic acid and fumaric acid.

38. The molded body obtained by hardening the composition of claim 1.

* * * * *